US012005638B2

(12) United States Patent
Alejandre Fernandez et al.

(10) Patent No.: US 12,005,638 B2
(45) Date of Patent: Jun. 11, 2024

(54) ADDITIVE MANUFACTURING GAS EXTRACTION

(71) Applicant: Hewlett-Packard Development Company, L.P., Spring, TX (US)

(72) Inventors: Ignacio Alejandre Fernandez, Sant Cugat del Valles (ES); Emilio Cano Arribas, Sant Cugat del Valles (ES); Cintia Perez Gutierrez, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 830 days.

(21) Appl. No.: 17/051,711

(22) PCT Filed: Oct. 18, 2018

(86) PCT No.: PCT/US2018/056487
§ 371 (c)(1),
(2) Date: Oct. 29, 2020

(87) PCT Pub. No.: WO2020/081083
PCT Pub. Date: Apr. 23, 2020

(65) Prior Publication Data
US 2021/0122108 A1 Apr. 29, 2021

(51) Int. Cl.
*B29C 64/153* (2017.01)
*B29C 64/393* (2017.01)
*B33Y 10/00* (2015.01)
B33Y 40/00 (2020.01)
B33Y 70/00 (2020.01)

(52) U.S. Cl.
CPC .......... *B29C 64/153* (2017.08); *B29C 64/393* (2017.08); *B22F 2999/00* (2013.01); *B33Y 10/00* (2014.12); *B33Y 40/00* (2014.12); *B33Y 70/00* (2014.12)

(58) Field of Classification Search
CPC .................................................. B22F 2999/00
See application file for complete search history.

(56) References Cited

U.S. PATENT DOCUMENTS

| 2011/0217208 A1 | 9/2011 | Narendrnath et al. |
| 2016/0282848 A1 | 9/2016 | Hellestam |

(Continued)

FOREIGN PATENT DOCUMENTS

| CN | 204172485 U | 2/2015 |
| CN | 204196047 U | 3/2015 |
| CN | 206605796 U | 11/2017 |

(Continued)

*Primary Examiner* — Catherine T. Rastovski
*Assistant Examiner* — Brian Butler Geiss
(74) *Attorney, Agent, or Firm* — Shook, Hardy & Bacon L.L.P.

(57) ABSTRACT

An example additive manufacturing system comprises a first fan associated with a print chamber to flow gas from the print chamber into an exhaust conduit. A sensor is arranged to detect one or more conditions of the gas flowed into the exhaust conduit from the print chamber by the first fan and to output a signal indicative thereof. A second fan is spaced apart in a downstream direction along the exhaust conduit from the first fan and a control unit is arranged to receive the signal from the sensor and to control the second fan in dependence thereon to maintain one or more conditions of the gas extracted from the print chamber.

15 Claims, 4 Drawing Sheets

(56) References Cited

U.S. PATENT DOCUMENTS

2017/0014905 A1   1/2017   Kawada et al.
2017/0146382 A1   5/2017   Gold et al.

FOREIGN PATENT DOCUMENTS

| CN | 206718478 U | 12/2017 |
| CN | 206953593 U | 2/2018 |
| CN | 107877861 A | 4/2018 |
| CN | 108145973 A | 6/2018 |
| CN | 108248041 A | 7/2018 |
| EP | 3181324 A1 | 6/2017 |

ADDITIVE MANUFACTURING GAS EXTRACTION

BACKGROUND

Additive manufacturing systems are increasingly being used to fabricate three-dimensional (3D) physical objects. The physical object is constructed layer-by-layer. This technique may be referred to as "printing" the object, and an additive manufacturing system may sometimes be referred to as a "3D printer".

The physical object is formed in a print chamber of the additive manufacturing system. The additive manufacturing process is dependent on conditions inside the print chamber. The conditions may include one or both of temperature and pressure within the print chamber. The temperature may have an influence on a condition of build material in the print chamber for printing successive layers of the object. The pressure, and in some processes a pressure distribution within the print chamber, may influence gas flow within and to/from the print chamber. If the gas flow associated with print chamber is outside of expected value(s), then the temperature within the print chamber may be consequently affected.

BRIEF DESCRIPTION OF THE DRAWINGS

Examples of the disclosure are further described hereinafter with reference to the accompanying drawings, in which.

DETAILED DESCRIPTION

Figure 1:
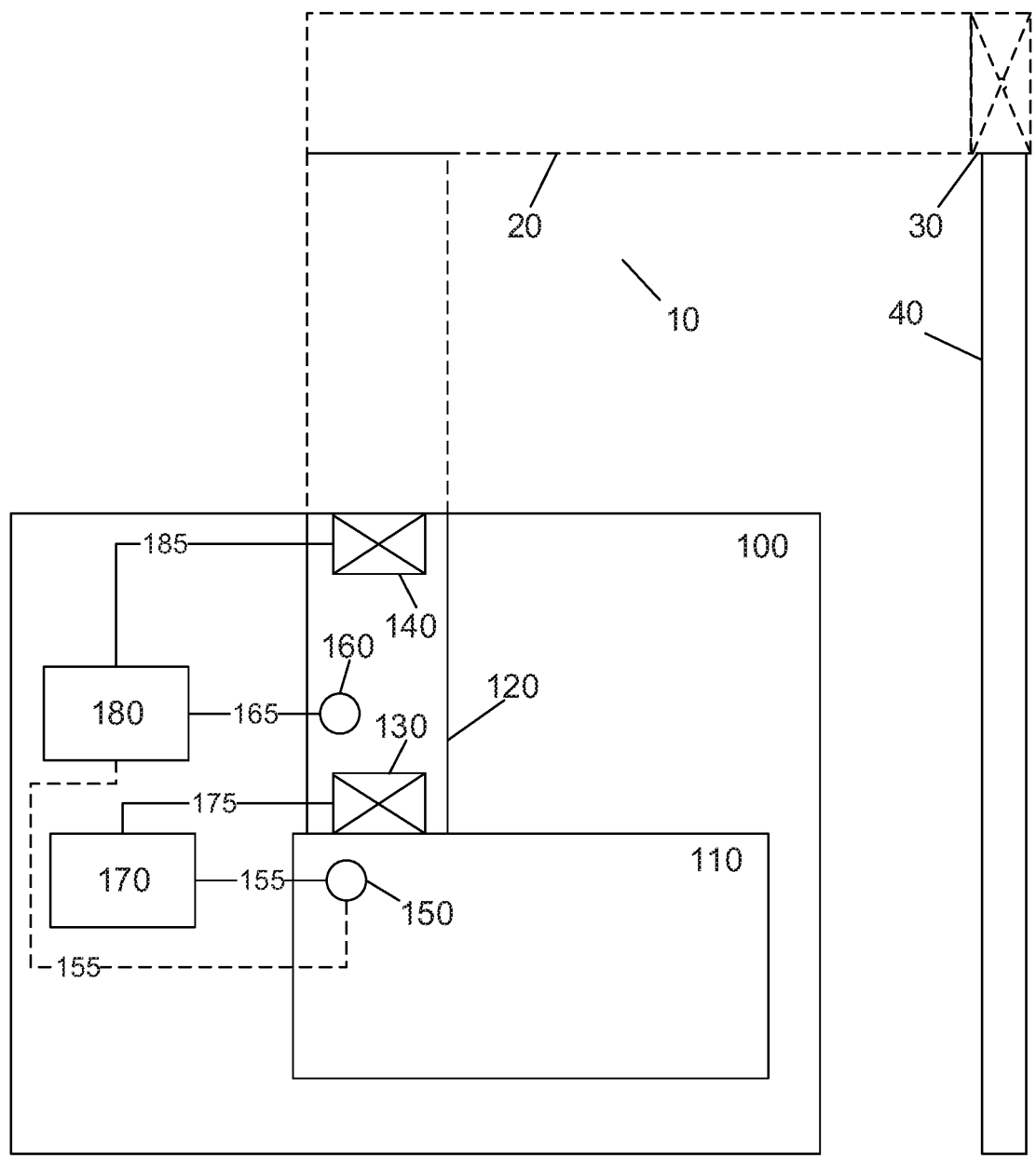
FIG. 1 is a diagram of an example additive manufacturing system.

FIG. 1 is a diagram of an example of an additive manufacturing system 100. In the additive manufacturing system 100 a 3D object is fabricated by forming layers or slices of the object successively one on top of the other. Such additive manufacturing may be referred to as 3D printing of the object.

The 3D object is formed from build material. The build material may be in the form of a powder or a liquid. The build material may be selectively fused together, in layers, to form the 3D object. The fusing process may be as a result of the application of directed heat to the build material or as a result of a chemical process in which the build material is bound using chemical binders, and may result in significant amounts of heat within a volume of the build material.

The build material may be or include, for example, powdered metal materials, powdered composite materials, powdered ceramic materials, powdered glass materials, powdered resin materials, powdered polymer materials and the like. In some examples where the build material is a powder-based build material, the term powder-based materials is intended to encompass both dry and wet powder-based materials, particulate materials and granular materials. It should be understood that the examples described herein are not limited to powder-based materials, and may be used, with suitable modification if appropriate, with other suitable build materials. In other examples, the build material may be in the form of pellets, or any other suitable form of build material, for instance.

In one example, the additive manufacturing system 100 has a build mechanism which uses a laser to selectively fuse the build material. The laser is accurately positioned to irradiate the regions of the build material to be fused in each layer.

Another example additive manufacturing system has a build mechanism that uses a heat source to fuse the build material in each layer, instead of a laser. The build material may be a light color powder, such as a white powder. A print engine controllably ejects drops of a liquid having a dark colorant, such as for example a black printing liquid, onto the regions of powder which correspond to the location of the 3D object within the corresponding layer. A heat source, such as for example one or more fusing lamps, is then passed over the layer. The regions of the build material on which the dark colored liquid have been deposited absorb sufficient radiated energy from the heat source to melt the build material in those regions, fusing that build material together and to the previous layer underneath, and then solidifying upon cooling. However, the regions of the build material on which the dark colored liquid have not been deposited remain light in color, and as such do not absorb sufficient radiated energy to melt the powder, but rather reflect the radiated energy. As a result, the light-colored regions of the layer remain unfused such as in powdered form. To fabricate the next layer of the object, another layer of build material is deposited on top of the layer which has just been fabricated, and the printing and fusing processes are repeated for the next layer. This process continues until the object has been completely fabricated.

The formation, or printing, of the 3D object from the build material takes place in a print chamber 110 of the additive manufacturing system 100. The print chamber 110 may be removably coupled to the additive manufacturing system 100. The build mechanism generates excess heat within the print chamber 110 which needs to be removed from the print chamber 110 in order to maintain one or more printing conditions within the print chamber 110, such as an internal temperature of the print chamber 110. The internal temperature of the print chamber 110 may need to be maintained within a predetermined temperature range to ensure, for example, properties of the formed 3D object. The properties of the 3D object may include one or more of dimensional properties of the formed object, mechanical properties, surface appearance or texture.

The additive manufacturing system 100 is connected, when installed, to an extractor 10 for extracting gas from the additive manufacturing system 100. The extractor 10 is not generally part of the additive manufacturing system 100, but forms part of infrastructure provided to support the additive manufacturing system 100. Thus the extractor 10 is illustrated in dotted lines in FIG. 1. The extractor 10 may flow the gas from the additive manufacturing system 100 external to a structure 40 within which the additive manufacturing system 100 is located, such as to an outside of a building 40 within which the additive manufacturing system 100 is located. In some additive manufacturing systems 100 the print chamber 110 is filled with a predetermined gas, such as an inert gas. In such systems the extractor 10 may renovate the extracted gas, such as clean and cool the gas, before the gas is reused. However, in other systems, the gas is air, in which case the air extracted from the print chamber 100 may be exhausted to a convenient location, such as external to a room or the building 40 within which the additive manufacturing system 100 is located. In the example illustrated in FIG. 1 the air from the print chamber 110 is exhausted to outside of the building 40 by the extractor 10.

The extractor 10 comprises an extractor conduit 20 which is connected to an outlet of the additive manufacturing system 100 to receive the gas exhausted from the additive manufacturing system 100. The extractor 10 may comprise one or more extractor fans 30 for flowing received gas through the extractor conduit 20 to an outlet of the extractor conduit 20, which may be outside of the building 40 in which the additive manufacturing system 100 is located. In the example extractor 10 shown in FIG. 1, the extractor 10 comprises an extractor fan 30. The extractor fan 30 in the example of FIG. 1 is associated with the building 40, such being mounted about a wall of the building 40 at the outlet of the extractor conduit 20.

The example additive manufacturing system 100 comprises the print chamber 110 and an exhaust conduit 120 for exhausting the gas, such as air, from the print chamber 110 to the outlet of the additive manufacturing system 100. The exhaust conduit 120 may be considered as one or more regions of the additive manufacturing system 100 through which gas from the print chamber 110 flows before reaching the extractor 10. The exhaust conduit 120 may be formed by a plurality of sections of conduit, such as a combination of rigid and flexible conduit sections. The exhaust conduit 120 is fluidically coupled to the print chamber 110 to flow gas from the print chamber 110. The example additive manufacturing system 100 comprises one or more first fans 130 which are arranged for at least assisting flowing gas from the print chamber 110 into the exhaust conduit 120. The one or more first fans 130 are associated with the print chamber 110, such as being located at an outlet of the print chamber 110 or internal to the print chamber 110, to assist the flow of gas from the print chamber 110 into the exhaust conduit 120. The example additive manufacturing system 100 comprises one or more second fans 140 which are spaced apart in a downstream direction from the first fan 130. The one or more second fans 140 are located further towards or downstream to the extractor 10 than the one or more first fans 130. The one or more second fans 140 are provided for flowing the gas through the exhaust conduit 120 toward the extractor 10.

In the example additive manufacturing system, various regions are maintained in use at different relative pressures. The maintenance of the regions at different relative pressures may assist in controlling the flow of gas within the additive manufacturing system 100, such as at predetermined flow rates, and to reduce leaks from the additive manufacturing system 100. The pressure of the various regions may be maintained with respect to an ambient air pressure. Therefore it will be understood that references to pressure may be relative pressure with respect to another region of the additive manufacturing apparatus 100.

The example additive manufacturing system 100 of FIG. 1 comprises one or more first sensors 150 for sensing one or more conditions of the print chamber 110. The one or more conditions may be one or more conditions of gas within the print chamber 110. The one or more first sensors 150 may comprise, in some examples, a gas pressure sensor 150 which is arranged to detect a gas pressure of gas internal to the print chamber 110. The gas pressure sensor 150 outputs a first signal 155 indicative of the determined gas pressure of the print chamber 110. The example additive manufacturing system 100 comprises a first control unit 170 which is arranged to receive the first signal 155 and to control the first fan 130 in dependence thereon. The first control unit 170 is arranged to control the first fan 130 to maintain a predetermined gas pressure within the print chamber 110. The first control unit may control a speed of the first fan 130 to maintain the gas pressure within the print chamber 110. The gas pressure within the print chamber may be maintained at a pressure which is less than that of a gas supply enclosure. The gas pressure within the print chamber 110 may be maintained at a pressure which is greater than that of the exhaust conduit 120. For example, the air supply enclosure may be maintained at a pressure of +15 Pa, the print chamber 110 at a pressure of 0 Pa or −4 Pa and the exhaust conduit at a pressure of −15 Pa. Other pressure values may be selected which maintain the relative pressure differentials to assist in controlling the flow of gas through the additive manufacturing system 100.

In some example additive manufacturing systems 100, the first sensor 150 comprises a flow sensor 150 arranged to detect a flow rate of gas, such as air, from the print chamber 110. The flow sensor 150 is arranged to output the first signal 155 indicative of the flow rate to the first control unit 170. The first control unit 170 is arranged to control the first fan 130 to maintain a predetermined flow rate of gas from the print chamber 110.

The first control unit 170 is arranged to output a first control signal 175 which is provided to the one or more first fans 130 to control the speed of the one or more first fans 130. It will be appreciated that, in some examples, the one or more first sensors 150 may comprise both a pressure and flow rate sensor and the first control unit 170 is arranged to maintain one or both of a gas pressure within and flow rate from the print chamber 110.

In some installations the extractor 10 may extract gas at a variable rate from the additive manufacturing system 100. For example, the extractor fan 30 may operate with a different power than intended for the additive manufacturing system 100, which may cause over or under-suction of gas from the additive manufacturing system 100. The over or under-suction may alternatively or additionally be influenced by conditions external to an outlet of the extractor 10, such as outside of the building 40. For example, weather conditions external to the building 40 may influence the suction. The over or under-suction may influence the pressure inside the print chamber 110 thereby causing pressure variation within the print chamber 110. The pressure variation, or thermal variations caused by the change in pressure or gas flow associated with the print chamber 110, may influence properties of the 3D objects formed within the print chamber 110 by the additive manufacturing system 100. In order to counteract the over or under-suction, the one or more second fans 140 are controlled to maintain one or more predetermined conditions intermediate to the one or more second fans 140 and the one or more first fans 130. Independent control of the one or more first fans 130 and the one or more second fans 140 improves an ability to maintain one or more predetermined conditions within the print chamber 110 irrespective of any over- or under-suction caused by the extractor 10 or external conditions. Improved maintenance of the predetermined conditions within the print chamber 110, such as gas pressure, gas flow rate and temperature, thereby improve an ability to produce 3D objects having predetermined or consistent properties within the print chamber 110.

The example additive manufacturing system 100 of FIG. 1 comprises one or more second sensors 160 for sensing one or more ambient conditions of gas flowed out of the print chamber 110. The one or more ambient conditions of gas flowed out of the print chamber 110 may be determined within the exhaust conduit 120 downstream of the one or more first fans 130. The one or more second sensors 160 are located between the one or more first fans and the one or more second fans within the exhaust conduit 120. The one or more second sensors 160 may be located between the first and second fans 130, 140. The one or more second sensors 160 may comprise in some examples a gas pressure sensor 160 which is arranged to detect a gas pressure within the exhaust conduit 120. The gas pressure sensor 160 is arranged to output a second signal 165 indicative of the determined gas pressure. The example additive manufacturing system 100 comprises a second control unit 180 which is arranged to receive the second signal 165 and to control the one or more second fans 140 in dependence thereon. The second control unit 180 is arranged to output a second control signal 185 to control a speed of the one or more second fans 140. The second control unit 180 is arranged to control the one or more second fans 130 to maintain a predetermined gas pressure within the exhaust conduit 120.

In some example additive manufacturing systems 100, the one or more second sensors 160 comprise a flow sensor 160 arranged to detect a flow rate of gas within the exhaust conduit 120. The flow sensor 160 is arranged to output the second signal 165 indicative of the determined flow rate. The second control unit 180 is arranged to control the one or more second fans 140 to maintain a predetermined flow rate of gas within the exhaust conduit 120. It will be appreciated that in some examples the one or more second sensors 160 may comprise both a pressure and flow rate sensor where the second control unit 180 is arranged to maintain one or both of a gas pressure and flow rate within the exhaust conduit 120, if possible. In some examples the second control unit 180 may also receive the first signal 155 from the one or more first sensors 150 to provide an indication of the one or more conditions within the print chamber 110. The second control unit 180 may control the one or more second fans 140 in part in dependence on the first signal 155 indicative of the conditions within the print chamber 110.

The one or more second sensors 160 may be arranged proximal to an outlet of the one or more first fans 130 to determine the ambient gas conditions within the exhaust conduit 120 relatively close to the outlet of the one or more first fans 130 such that the one or more second fans 140 are controlled by the second control unit 180 to assist the one or more first fans 130 maintaining conditions within the print chamber 110. The one or more second fans 140 may assist in isolating the print chamber 110 from any over- or under-suction of the extractor 10. In this way conditions in the print chamber 110, such as gas conditions and temperature, may be more tightly maintained.

Figure 2:
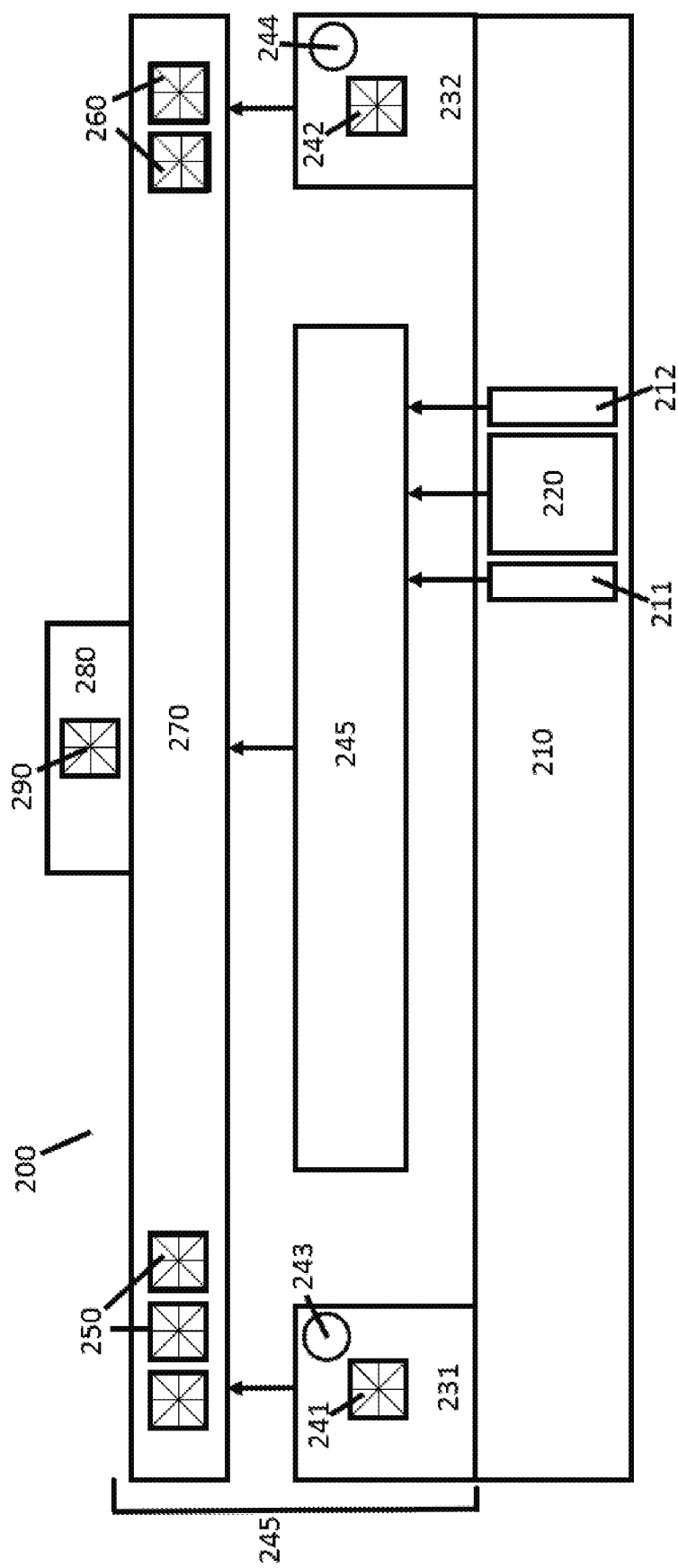
FIG. 2 is a diagram of another example additive manufacturing system.

FIG. 2 schematically illustrates another example additive manufacturing system 200. The example additive manufacturing system 200 comprises a print chamber 210, a print carriage 220 which is moveably arranged in relation to the print chamber 210 and is associated with one or more heat sources 211, 212 which, in the example additive manufacturing system 200, are first and second fusing lamps 211, 212 which are arranged, respectively at left- and right-hand sides of the print carriage 220. In use, the first and second fusing lamps 211, 212 heat build material within the print chamber 210. The print chamber 210 may be maintained in use at a negative pressure, such as −4 Pa to ensure a relative pressure differential within the additive manufacturing system, although it will be appreciated that other pressures values may be selected whilst maintaining the differential pressures.

The additive manufacturing system 200 comprises at least one cooling volume for allowing gas from the print chamber 210 to cool. The example additive manufacturing system 200 comprises first and second cooling towers 231, 232. The first and second cooling towers 231, 232 are located, respectively, at left- and right-hand sides of the print chamber 210. The example additive manufacturing system 200 comprises a plurality of first fans 241, 242 which are associated with the print chamber 210 to flow gas from the print chamber 210. One of the first fans 241 is associated with the first cooling tower 231 and one of the first fans 242 is associated with the second cooling tower 232. Each of the first fans 241, 242 flows gas from the print chamber 210 into the respective one of the cooling towers 231, 232. The first fans 241, 242 are arranged in parallel to assist in flowing the gas from the print chamber 210.

The example additive manufacturing system 200 comprises a lung 245 for receiving gas from the one or more of the first and second fusing lamps 211, 212 and the print carriage 210. The lung 245 may be maintained in use at a lower relative pressure than the print chamber 210 to encourage a flow of gas from the print chamber 210 into the lung 245.

The example additive manufacturing system 200 comprises an exhaust manifold 270 and a plurality of second fans 250, 260. The exhaust manifold 270 is in fluid communication with the first and second cooling towers 231, 232 to receive gas from the cooling towers 231, 232. In this example an exhaust conduit 245 is formed by a combination of the cooling towers 231, 232 and the exhaust manifold 270. The plurality of second fans 250, 260 are spaced apart in a downstream direction of the exhaust conduit 245 from the first fans 241, 242. The downstream direction is defined with respect to gas flowing from the print chamber 210 toward the exhaust manifold 270. The second fans 250, 260 are arranged to flow gas along the exhaust conduit 245 from the cooling towers 231, 232 to the exhaust manifold 270. In the example additive manufacturing system 200 a first group of second fans 250 comprising one or more of the second fans 250, three second fans 250 in the illustrated example, are associated with the first cooling tower 231 to flow air to the exhaust manifold 270. The fans forming the first group 250 are arranged in parallel. A second group of second fans 260 comprising one or more of the second fans, two second fans 250 in the illustrated example, are associated with the second cooling tower 232 to flow air to the exhaust manifold 270. The fans forming the second group 260 are arranged in parallel. Each of the plurality of second fans 250, 260 is controlled as described in relation to the above example to maintain one or more conditions of the gas extracted from the print chamber 210. The one or more conditions comprise one or both of a pressure of gas extracted from the print chamber 210 and a predetermined flow of gas extracted from the print chamber 210. The one or more conditions are determined in the example additive manufacturing system 200 at a location within the exhaust conduit 245 between the second fans 250, 260 and the first fans 241, 242, such as proximal to the first fans 241, 242 in the cooling towers 231, 232. A speed of at least some of the plurality of second fans 250, 260 is controlled to maintain the one or more conditions.

A first sensing device 243 is arranged within exhaust conduit 245. The first sensing device is arranged in the example in the left-hand cooling tower 231 in the example additive manufacturing system 200. The first sensing device 243 is arranged to determine the one or more conditions, such as one or both of gas pressure and flow, within the left-hand cooling tower 231. The first sensing device 243 is arranged to output a signal indicative of the one or more conditions. A second sensing device 244 is arranged within the right-hand cooling tower 232 in the example additive manufacturing system 200. The second sensing device 244 is arranged to determine the one or more conditions, such as one or both gas pressure and flow within the right-hand cooling tower 232. The second sensing device 244 is arranged to output a signal indicative of the one or more conditions. The signals output by the first and second sensing device 243, 244 are used to control the second fans 250, 260 to maintain the one or more conditions within the cooling towers 231, 232 at a predetermined value or within a predetermined range of values. The signal output by the first sensing device 243 is used in the example additive manufacturing system 200 to control the first group of second fans 250 associated with the first cooling tower 231. The signal output by the second sensing device 244 is used in the example additive manufacturing system 200 to control the second group of second fans 260 associated with the second cooling tower 232. In some examples a further sensing device may be arranged to determine one or more conditions at an outlet of the extractor 10 to which the additive manufacturing system 200 is coupled. The further sensing device may be arranged to provide a signal indicative of one or more reference conditions, such as a reference air pressure external to the extractor 10.

In the example additive manufacturing system 200 the exhaust manifold 270 is provided with an outlet 280 for coupling to the extractor 10 for conveying exhausted gas. The extractor 10 may be connected to an outside of a building in which the additive manufacturing system 200 is located. One or more tertiary fans 290 are arranged to flow gas from the exhaust manifold 270 into the outlet 280.

Figure 3:
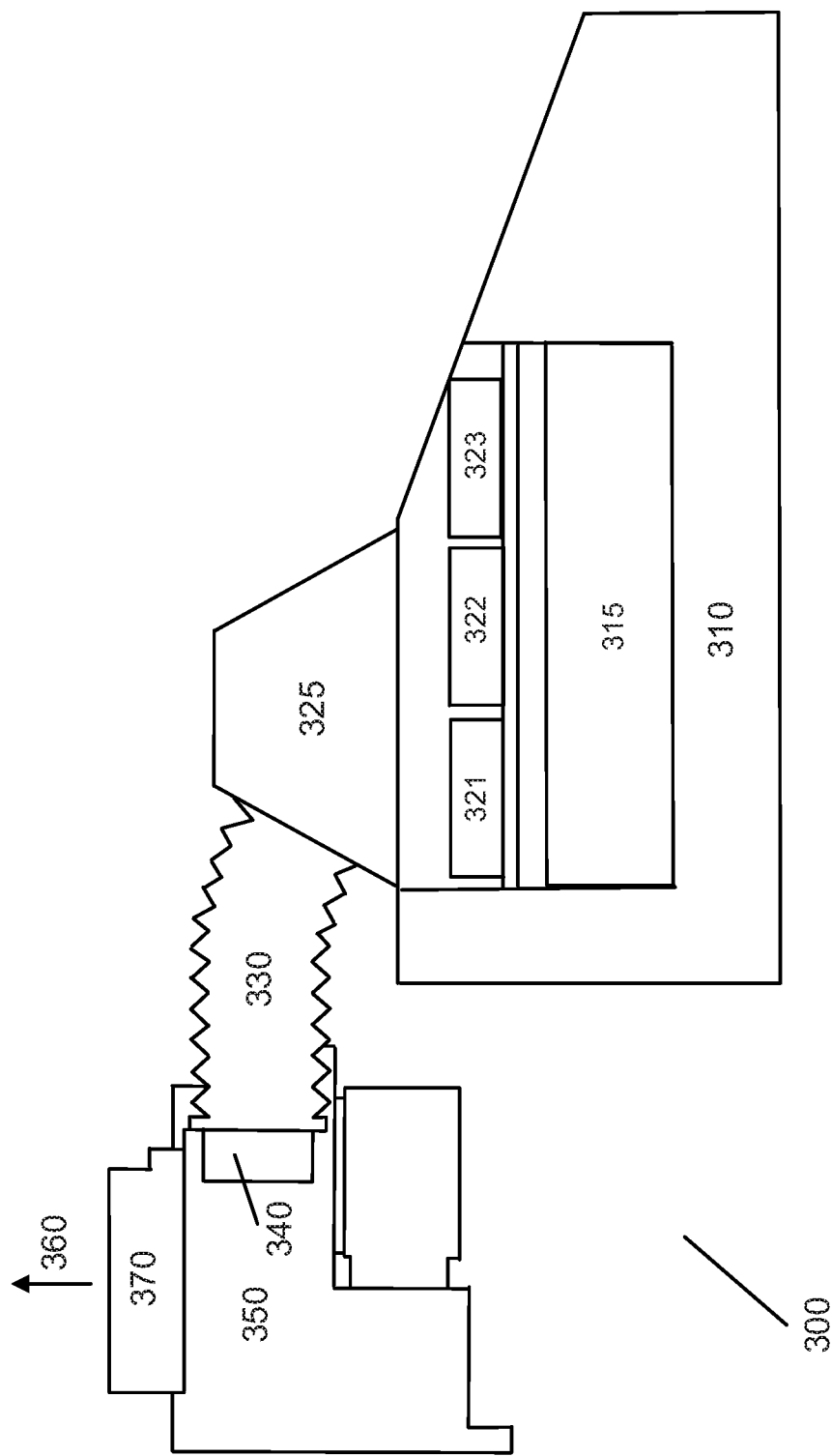
FIG. 3 is a diagram of a further example additive manufacturing system.

FIG. 3 illustrates a side cross section through an upper portion an example additive manufacturing system 300. The example additive manufacturing system 300 comprises a print chamber 310 in which a print carriage 315 is moveably mounted. A plurality of first fans 321, 322, 323 are arranged to flow gas from the print chamber 310 into a cooling tower 325 located above the print chamber 310. The cooling tower 325 is communicably coupled to an exhaust manifold 350 by a flexible conduit 330. One or more second fans 340 are arranged to flow gas through the conduit 330 between the cooling tower 325 and the exhaust manifold 350. A speed of the one or more second fans 340 is controlled in order to maintain one or more predetermined conditions proximal to the first fans 321, 322, 323. As described above the one or more predetermined conditions may be one or both of gas pressure and a flow rate of gas from the print chamber 310. Gas is drawn from the exhaust manifold 350 to an exhaust conduit 360 as illustrated in FIG. 3. The example additive manufacturing system 300 comprises one or more third fans 370 for exhausting gas from the exhaust manifold 350. The third fan 370 is an exhaust fan 370 in the example additive manufacturing system 300 which is arranged to flow gas into the exhaust conduit 360. The exhaust fan 370 may be located at an outlet of the exhaust manifold.

Figure 4:
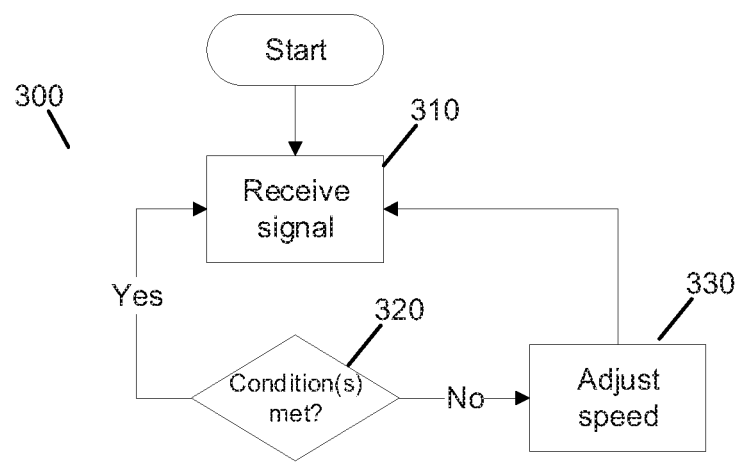
FIG. 4 is a flow diagram illustrating a method performed in an additive manufacturing system according to an example.

FIG. 4 illustrates a method 400 which may be performed in an additive manufacturing system 100, 200, 300 such as that illustrated in FIG. 1, 2 or 3 as described above. The method 400 is performed by a controller 180 arranged to control one or more of the second fans 140, 250, 260, 340 where machine executable instructions representing the method 400 are stored on a machine-readable medium accessible to the controller 180. The machine-readable instructions being executable by the controller 180 of the example additive manufacturing system 100, 200, 300 as described above. The machine executable instructions comprise instructions to control one or more second fans 140, 250, 260, 340 in dependence on a signal 165 indicative one or more predetermined conditions of gas extracted from a print chamber 110, 210, 310 of the additive manufacturing system 100, 200, 300 to maintain the one or more conditions of the gas extracted from the print chamber 110, 210, 310.

The method 400 comprises a block 310 comprising receiving a signal such as the signal 165, indicative of the one or more conditions of gas extracted from the print chamber 110, 210, 310 by the one or more first fans 130, 241, 242. The signal 165 is received from a sensing device 160, 243, 244 arranged to sense one or more conditions of gas flowed out of the print chamber 110, 210, 310. The sensing device 160, 243, 244 may be arranged at a location proximal to a first fan 130, 241, 242 of the additive manufacturing system 100, 200, 300.

The method 400 comprises a block 320 which comprises determining whether the one or more conditions of the gas flowed out of the print chamber 110, 210, 310 are each at a predetermined value, or within a predetermined range of values. For example, block 320 may comprise determining whether a gas pressure of the gas flowed out of the print chamber 110, 210, 310 is within a predetermined range of values, or is flowing at a predetermined rate from the print chamber 210.

If the one or more predetermined conditions are not met then the method moves to block 330, wherein a speed of the one or more second fans 140, 250, 260, 340 is adjusted. For example, if the pressure of the gas is below the predetermined value or range of values, then the speed of the one or more second fans 140, 250, 260, 340 is reduced in block 330 to increase the pressure of the gas upstream from the one or more second fans 140, 250, 260, 340 proximal to the first fan 130, 241, 242 of the additive manufacturing system 100, 200, 300. Similarly if the pressure of the gas is above the predetermined value or range of values, then the speed of the one or more second fans 140, 250, 260, 340 is increased in block 330 to reduce the pressure of the gas upstream from the one or more second fans 140, 250, 260, 340 proximal to the first fan 130, 241, 242 of the additive manufacturing system 100, 200, 300.

It will be appreciated that use of one or more second fans which are spaced apart in a downstream direction, for example, toward an exhaust outlet of an additive manufacturing system, from the one or more first fans where the one or more second fans are controlled in dependence on one or more conditions of gas extracted from the print chamber by the first fan may improve one or more properties of objects formed in the print chamber.

The invention claimed is:

1. An additive manufacturing system, comprising:
    a first fan to at least assist in flowing gas from a print chamber into an exhaust conduit to maintain one or more gas conditions within the print chamber;
    a sensor to detect one or more conditions of the gas in the exhaust conduit and to output an exhaust condition signal indicative thereof;
    a second fan spaced apart along the exhaust conduit from the first fan;
    a control unit arranged to control the second fan in dependence on the exhaust condition signal to maintain one or more conditions of the gas within the exhaust conduit, thereby assisting the first fan in maintaining the one or more gas conditions within the print chamber.

2. The additive manufacturing system of claim 1, wherein the sensor comprises at least one gas pressure sensor arranged to detect a pressure of the gas within the exhaust conduit, and to output the exhaust condition signal indicative thereof, and the control unit is arranged to control the second fan to maintain a predetermined pressure of gas within the exhaust conduit.

3. The additive manufacturing system of claim 1, wherein the sensor comprises at least one gas flow sensor arranged to detect a flow rate of the gas within the exhaust conduit and to output the exhaust condition signal indicative thereof, and the control unit is arranged to control the second fan to maintain a predetermined flow of gas within the exhaust conduit.

4. The additive manufacturing system of claim 1, wherein the sensor is arranged to detect one or more conditions of the gas within the exhaust conduit proximal to an outlet of the first fan.

5. The additive manufacturing system of claim 1, wherein the second fan is associated with a manifold of the exhaust conduit.

6. The additive manufacturing system of claim 1, wherein the second fan comprises a plurality of second fans.

7. The additive manufacturing system of claim 6, wherein:
   the first fan comprises a plurality of fans arranged to each extract gas from respective regions of the print chamber;
   at least some of the second fans are arranged to at least assist in flowing gas exhausted from a first region of the print chamber and at least some of the second fans are arranged to flow gas exhausted from a second region of the print chamber.

8. The additive manufacturing system of claim 1, wherein the exhaust conduit comprises a cooling volume interposing the first and second fans.

9. The additive manufacturing system of claim 1, comprising:
   a sensor to detect one or more conditions of the gas in the print chamber and to output a print chamber condition signal indicative thereof;
   wherein the control unit is arranged to control the second fan in dependence on the print chamber condition signal.

10. The additive manufacturing system of claim 1, wherein the control unit is arranged to control a speed of the second fan to maintain the one or more conditions of the gas extracted from the print chamber within the exhaust conduit.

11. The additive manufacturing system of claim 1, wherein the control unit is arranged to control a speed of the second fan to maintain the one or more conditions of the gas within the exhaust conduit between the first and second fans.

12. The additive manufacturing system of claim 6, wherein the plurality of second fans comprises a plurality of fans arranged in parallel.

13. Machine executable instructions stored on a non-transitory machine-readable medium, the instructions being executable by a controller of an additive manufacturing system having a first fan associated with a print chamber to maintain one or more conditions in the print chamber by at least assisting flowing air from the print chamber into an exhaust conduit, a sensor to detect one or more conditions of the gas in the exhaust conduit and to output a signal indicative thereof, a second fan spaced apart along the exhaust conduit from the first fan, the machine executable instructions comprising instructions to control the second fan in dependence on the one or more conditions of the gas in the exhaust conduit thereby assisting the first fan in maintain the one or more conditions in the print chamber.

14. The additive manufacturing system of claim 13, wherein the sensor comprises a pressure sensor arranged to detect a pressure of the gas within the exhaust conduit and the machine executable instructions comprise instructions to control the second fan to maintain a predetermined pressure of gas within the exhaust conduit.

15. The additive manufacturing system of claim 13, wherein the sensor comprises a gas flow sensor arranged to detect a flow rate of gas within the exhaust conduit and the machine executable instructions comprising instructions to control the second fan to maintain a predetermined flow of gas within the exhaust conduit.

* * * * *